US007755671B2

(12) United States Patent
Wang et al.

(10) Patent No.: US 7,755,671 B2
(45) Date of Patent: Jul. 13, 2010

(54) CORRECTING A CAPTURED IMAGE IN DIGITAL IMAGING DEVICES

(75) Inventors: Yu-wei Wang, Fort Collins, CO (US); Robert Sobol, Fort Collins, CO (US); Kevin Matherson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 11/738,635

(22) Filed: Apr. 23, 2007

(65) Prior Publication Data

US 2008/0259186 A1 Oct. 23, 2008

(51) Int. Cl.
*H04N 9/73* (2006.01)
(52) U.S. Cl. ............................ 348/223.1; 348/224.1
(58) Field of Classification Search .............. 348/223.1, 348/224.1
See application file for complete search history.

(56) References Cited

U.S. PATENT DOCUMENTS

| 5,267,026 | A | * | 11/1993 | Kawahara et al. ......... 348/223.1 |
| 5,398,058 | A | * | 3/1995 | Hattori .................... 348/224.1 |
| 6,947,079 | B2 | * | 9/2005 | Parulski et al. ........... 348/223.1 |
| 7,098,945 | B1 | * | 8/2006 | Sasai et al. ............... 348/223.1 |
| 7,391,450 | B2 | * | 6/2008 | Pinto et al. ................. 348/251 |
| 7,408,576 | B2 | * | 8/2008 | Pinto et al. ................. 348/251 |
| 2002/0080245 | A1 | | 6/2002 | Parulski et al. |
| 2002/0122119 | A1 | * | 9/2002 | Takakura ................. 348/223.1 |
| 2003/0007707 | A1 | * | 1/2003 | Gallagher .................. 384/224 |

FOREIGN PATENT DOCUMENTS

| JP | 07007734 A | 1/1995 |
| JP | 2006262404 A | 9/2006 |

OTHER PUBLICATIONS

PCT International Search Report; Aug. 28, 2008; 3 pgs.

* cited by examiner

*Primary Examiner*—James M Hannett

(57) ABSTRACT

A method is provided for correcting a captured image. The method comprises determining an illuminant for the captured image. When the determined illuminant matches a reference illuminant the image is corrected with a reference inversion mask. When the determined illuminant matches a first extreme illuminant, the reference inversion mask is modified using a first set of reference point ratios that corresponds to the first extreme illuminant and the image is corrected with the modified inversion mask. When the determined illuminant does not match the first extreme illuminant, a set of reference point ratios are calculated for the determined illuminant. The reference inversion mask is modified using the calculated set of reference point ratios and the image is corrected with the modified inversion mask.

19 Claims, 4 Drawing Sheets

1a

1b

CORRECTING A CAPTURED IMAGE IN DIGITAL IMAGING DEVICES

BACKGROUND

Digital imaging devices capture images over a wide range of illuminants. Typically the digital imaging device will color correct the captured image with a different correction mask for each of the different illuminants. This requires the digital imaging device to store a large number of different correction masks, for example 15 different correction masks. These correction masks take up considerable space inside the digital imaging device.

In addition, calibrating each camera module over the wide range of different illuminant takes considerable time. The camera module must be properly aligned with the camera's optical axis perpendicular to a uniformly screen illuminated at the proper color temperature. One or more exposures are taken using each of the different illuminant choices. The different images are then used to create the different illuminant-dependent calibration data.

The time required to calibrate the camera module at each of the different color temperature illuminants and the memory needed to store each illuminant-dependent calibration data are the largest issues with current calibration methods.

DETAILED DESCRIPTION

Figure 2:
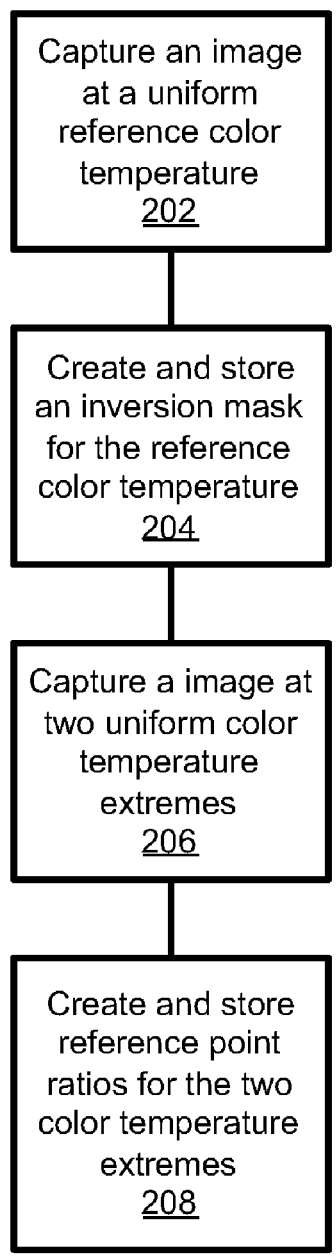
FIG. 2. is a flow chart for creating the calibration reference map and the two sets of reference point ratios in an example embodiment of the invention.
Figure 3:
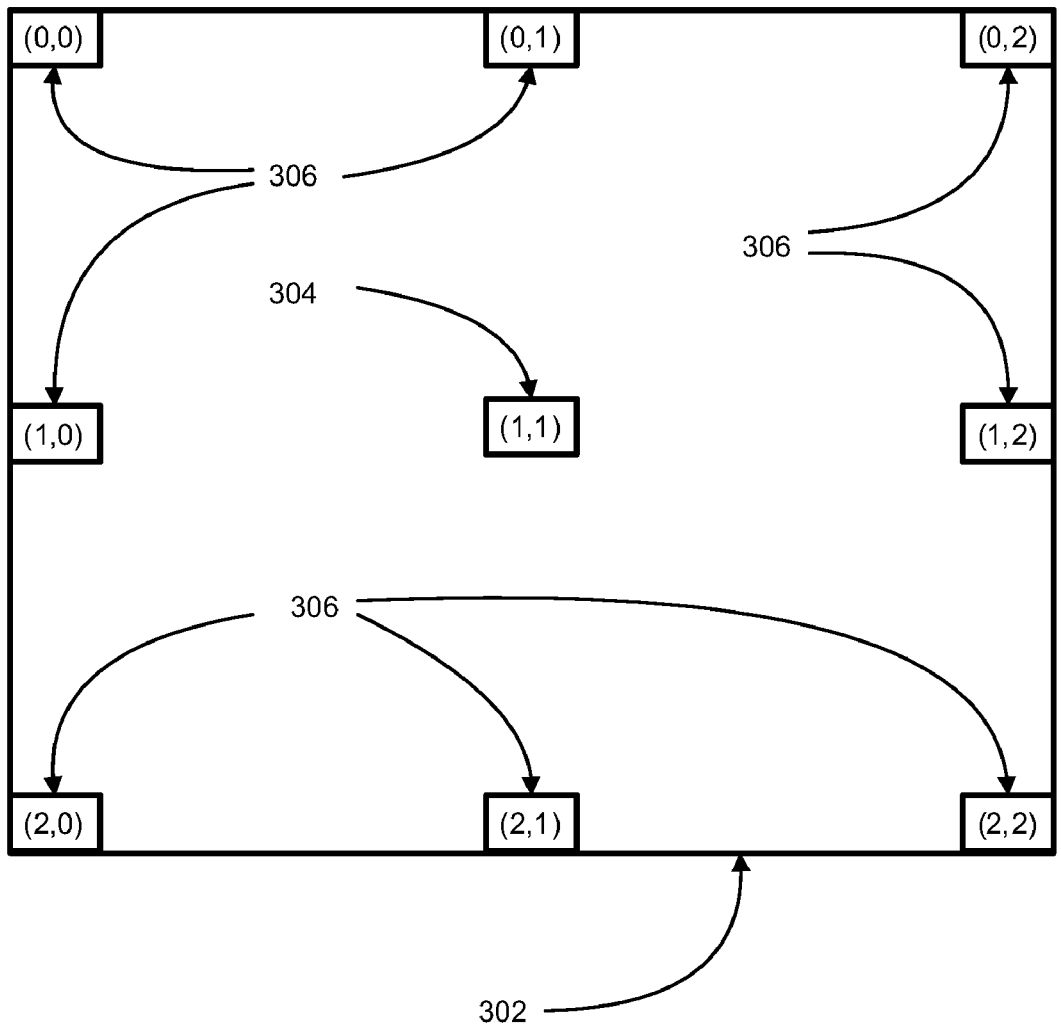
FIG. 3. is a block diagram of an image sensor 302 showing the locations used to create a set of reference point ratios, in an example embodiment of the invention.
Figure 4:
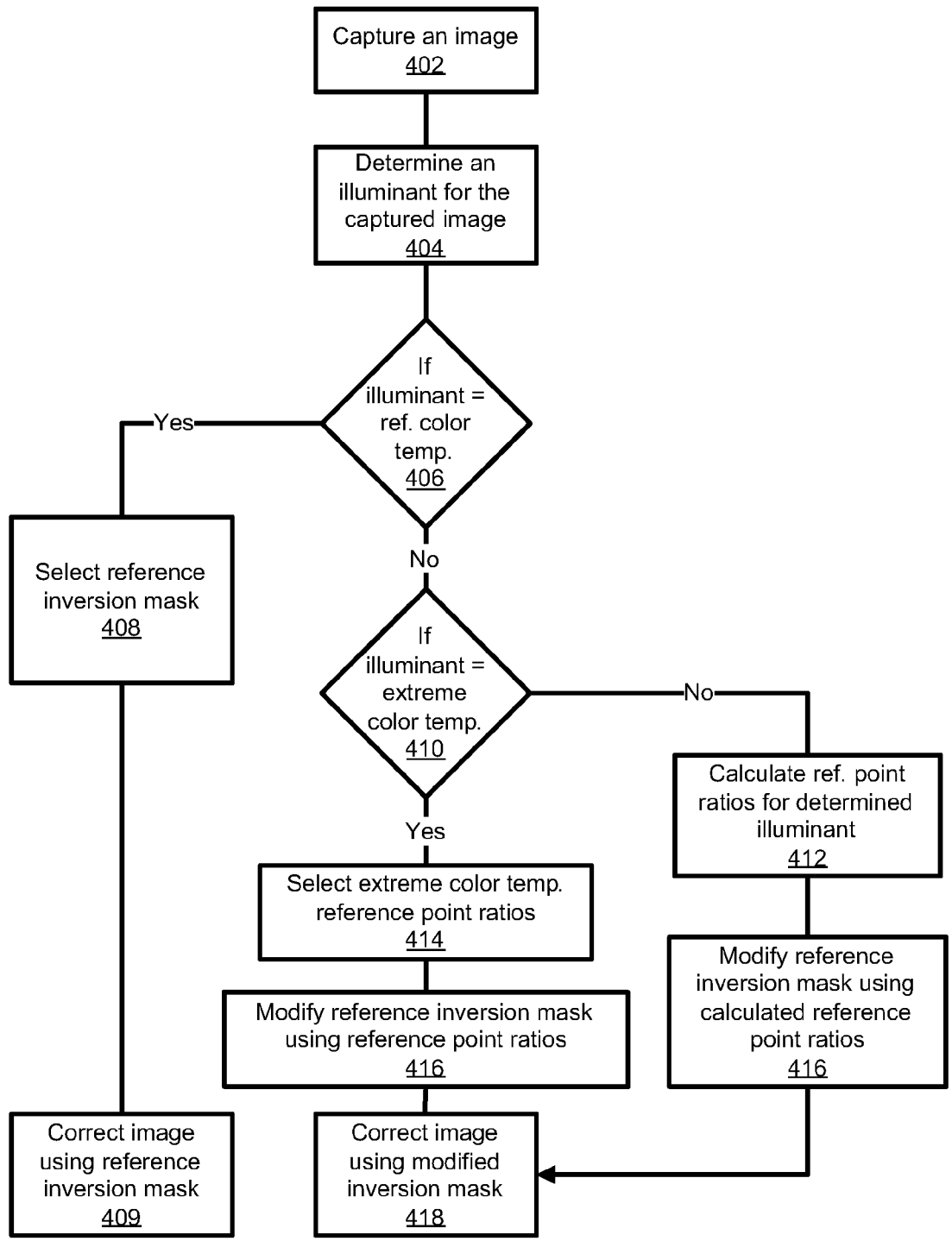
FIG. 4. is a flow chart showing the process used to correct an image in an example embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Digital cameras and other electronic image capture devices use image sensors that comprise a number of sensor elements commonly known as pixels. Each pixel collects light from the viewed scene that is to be captured. In devices configured to capture color images, each pixel collects light information corresponding to a particular color (e.g. red, green, or blue) from the light that is transmitted to the sensor from the lens system. In cases where the imaging sensor only comprises a single image sensor as opposed to a separate dedicated image sensor for each captured color, the light that is transmitted to the sensor is filtered so that each individual pixel collects light from a single color. This filtering is typically achieved using a two-dimensional color filter array that is laid over the sensor.

Most filter arrays comprise a mosaic of color filters that are aligned with the various pixels of the image sensor. The most common filter arrays implement what is known in the art as a Bayer pattern. When a Bayer pattern is used, filtering is provided such that every other pixel collects green light and pixels of alternating rows collect red light and blue light respectively, in an alternating fashion with pixels that collect the green light.

Almost all digital imaging systems have a lens. The main function of any lens is to bend light rays in a controlled fashion. The power of a lens is a measure of its ability to bend light rays. Higher-power lenses bend light rays at greater angles than do lenses with lower power. Lenses used in compact digital imaging systems tend to be very compact, have high power, and bend light rays at large angles.

Lens systems used for digital imaging devices comprise a number of lens elements and an IR-cut filter that acts as an optical bandpass filter. Generally, imaging systems are developed assuming the lens system that transmits and focuses light on the sensor is ideal. In reality, the lens power, the IR-cut filter, and the finite collection angle of the pixel, cause the light intensity and frequency collected by the sensor to vary spatially across the sensor.

In a lens, the light rays along the optical axis of the lens travel parallel to the optical axis. These rays pass through the IR-cut filter at an angle perpendicular to the surface of the IR-cut filter and hit the sensor normal to the sensor surface. Off-axis rays make an angle with respect to the surface normal of the IR-cut filter. The angle made with respect to the surface normal increases as the distance from the optical axis increases. In cases where the ray angles from the lens are extreme, two effects generally occur. The first effect is color crosstalk.

Color crosstalk occurs when light destined for either the red, green, or blue pixel travels through that pixel and is collected by an adjacent pixel of a different color. Color crosstalk has the effect of reducing the amount of light collected by each pixel as well as aberrating the color information used in processing the image.

A second effect that occurs involves the IR-cut filter used to limit the optical bandpass of the light captured by the image sensor. When the incoming light make an angle with respect to the normal of the coated surface, there is a general shift of the optical bandpass cutoff wavelength towards shorter wavelengths. As the angle increases, the shift in bandpass increases. This shift towards shorter wavelengths causes a spatially varying color shift across the sensor if it is not corrected for.

Figure 1:
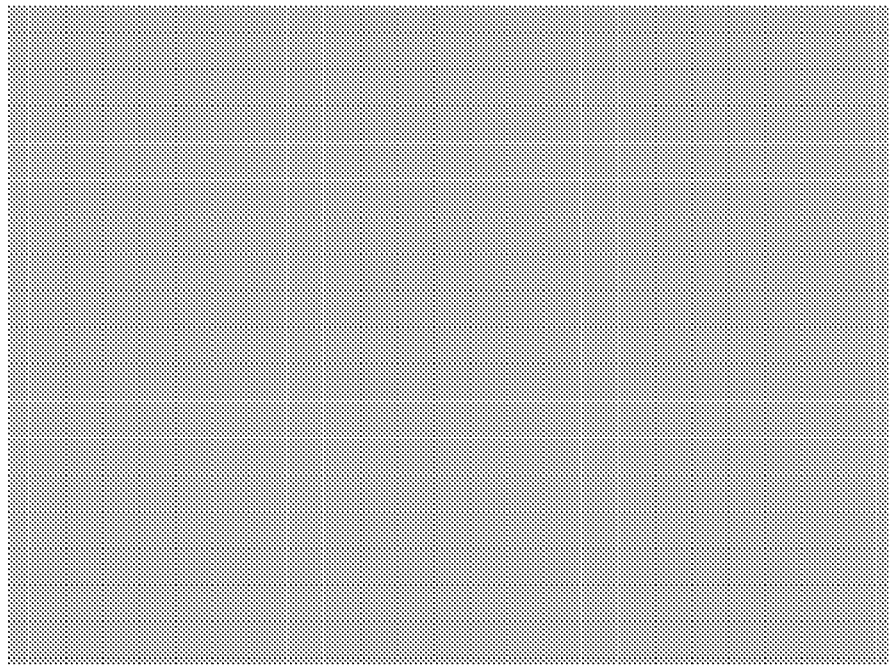
FIG. 1a. shows an example of a uniform image.
FIG. 1b. shows the un-corrected results from a digital imaging device when capturing a uniform image.
Figure 1:
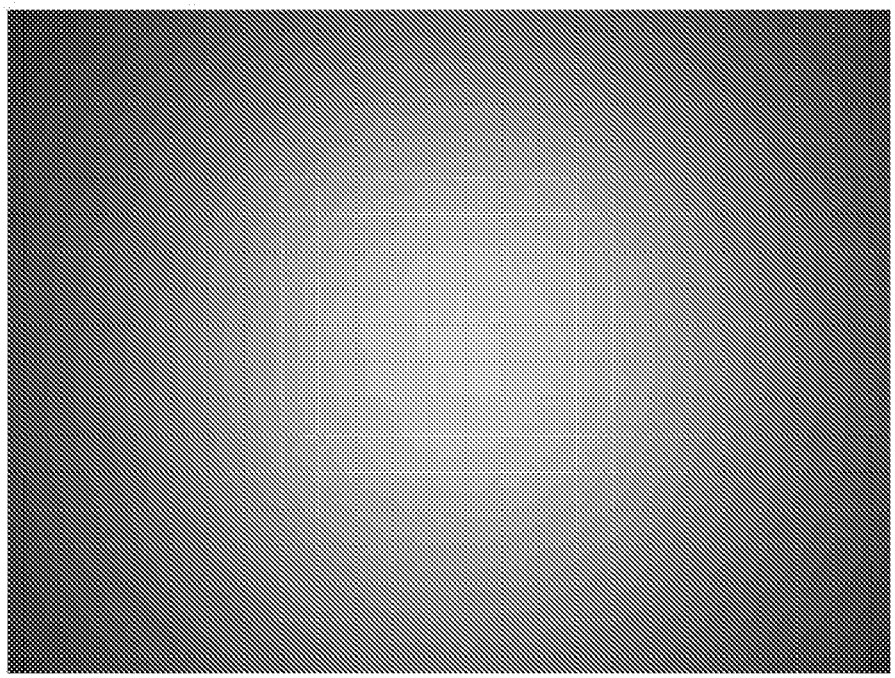

The common approach for fixing spatially-varying color uniformity is calibration of the image capture device using a spatially uniform light source having a given color temperature. Such calibration approaches are well known to those skilled in the art. As an example, consider the image of a spatially uniform light source captured by a digital imaging device. The image can be represented by the variable uniform_image(x,y) where x and y are the coordinates of each pixel. FIG. 1a shows an example of a uniform image. Due to color cross talk, color shading, lens properties, and misalignment of the optical center of the lens and the mechanical center of the sensor, the image in FIG. 1b shows the raw or un-corrected results from a digital imaging device when capturing a uniform image.

The captured image can be represented as a variable actual_image(x,y) in which the letters x and y represent the coordinates of each pixel. Uniformity correction can be modeled as a scalar multiplication of the actual image by a gain mask consisting of digital values that correct the image point by point as follows: uniform_image(x,y)=inversion_mask(x,y)*actual_image(x,y), where the operation* is a scalar multiplication. The values of the inversion_mask(x,y) are found as follows: inversion_mask(x,y)=uniform_image(x,y)/actual_image(x,y), where/denotes scalar division. Once the inversion mask has been calculated during a standard calibration, it is used to correct brightness and color variation in all images captured with this digital imaging device.

The calibration procedure described above is valid for cases where color crosstalk or optical bandpass shifts do not occur. However, this calibration procedure is invalid for extremely compact digital imaging devices used in portable phones. Such devices have severe color crosstalk due to the use of lenses that have large ray angles. Severe color cross talk creates a problem when an image, taken under a light source with a first color temperature, is corrected with an inversion mask calculated from a uniform image taken using a light source with a different color temperature. For example, when an image is captured using a light source whose color temperature is approximately 2800K, and processed using a 5500K spatially uniform calibration light source, a gray background in the image will vary in color across the image. This is due to the color crosstalk and filter effects described when the color temperature of the light used for calibration is not close to the color temperature of the illuminant used when capturing the image.

This problem requires calibration of camera modules under various color temperature illuminants. This illuminant-dependent calibration data is then stored and used in a look-up table with algorithms known to those skilled in the art. Assume that there are 15 illuminant choices for a camera system and that the inversion mask size is 80×60. Let us further assume that two bytes per color need to be stored. The total memory requirement is equal to 80*60*(2 bytes)*(4 color planes)*(15 illuminants)=576000 bytes.

In the past, to calibrate a digital imaging device, an image of a spatially-uniform light source at a plurality of known reference color temperatures would be captured using the digital imaging device. A gain map, also known as an inversion mask, of these images would be created. Prior to storage in memory, the inversion mask may be low-pass filtered to reduce high-frequency variation in noise and down sampled to reduce the memory storage size. When a user captures an image with the digital imaging device, the inversion mask corresponding to the color temperature of the captured image is applied to the captured image in order to correct for the non-uniformity in the image. When the camera operates in an environment with a wide range of lighting conditions, as many as 15 different inversion masks may be stored in the camera.

In one example embodiment of the invention, only one reference inversion mask and two sets of reference point ratios are created for calibrating the captured images across the full range of different illuminant choices. The two sets of reference point ratios are a few points for each Bayer color plane created at the extrema of the color temperatures. FIG. 2 is a flow chart for creating the calibration reference map and the two sets of reference point ratios in an example embodiment of the invention.

An image of a spatially-uniform light source with a reference color temperature, for example 5500K, is captured at step 202. A reference inversion mask is created from the captured image and stored at step 204. An image of a spatially-uniform light source at both extremes of illuminant choices within the band-pass limit of the camera system, for example 7500K and 2800K, are captured in step 206. A set of reference point ratios for each extreme illuminant choice is created and stored in step 208.

Only a limited number of locations are used to create each set of reference point ratios for the two extreme illuminant choices. FIG. 3 is a block diagram of an image sensor 302 showing the locations used to create a set of reference point ratios, in an example embodiment of the invention. In one example embodiment of the invention, nine locations are selected from image sensor 302 to be used in creating each set of reference point ratios. The nine locations comprise a location 304 in the center of image sensor 302, and eight other locations 306 evenly spaced around the edge of image sensor 302. Each of the locations can be represented by the row and column (r, c) for that location, for example the center location 304 is at row 1, column 1 or (1, 1).

With a set of reference point ratios comprising nine locations, the total memory requirements for the calibration information is equal to the memory required to store one reference inversion mask+the memory required to store two sets of reference point ratios (one at each color temperature extreme) or: ((80*60)*(2 bytes)*(4 color planes))+((9 points per color plane)*(4 color planes)*(2 bytes)*(2 color temperature extremes))=38544 bytes. Where 80×60 is a typical size for a reference mask, 2 bytes are required to store the value with the proper precision, and a Bayer color pattern typically is considered to have four different color planes (red, blue, green/blue and green/red). This compares well with the memory required to store 15 reference inversion masks equaling 576000 bytes (from the example above) for a savings of 576000 bytes−38544 bytes=537,456 bytes. As the number of illuminant choices increase, the savings in memory also increases.

In another example embodiment of the invention, the number of the locations used in creating each set of reference point ratios may be different, for example 13 or 25 locations spaced around the image sensor. In another example embodiment of the invention, the spacing of the locations used in creating each set of reference point ratios may be different, for example a non-linear spacing may be used. One example of a non-linear spacing is where the number of pixels between different locations doubles. For example there would be a first location at the edge of the sensor, a second location 3 pixels from the edge, a third location 6 pixels from the edge, a fourth location 11 pixels from the edge, and so on until the pixel in the middle of the CCD is reached.

The reference point ratios stored in memory at step 208 are ratios of inversion masks for each color plane. The reference point ratios stored can be thought of as a correction factor that can be applied to the reference mask stored at step 204. For example, assume that the reference mask was generated using a 5500K spatially uniform light source. Using the nine locations for reference point ratios shown in FIG. 3 (rows 0-2 and columns 0-2) let the variable R2899K/5500K (0,0) represent correction of the color non-uniformity at 2800K using the reference mask of 5500K at location (0,0) for the red color plane and follow the same format for all other color planes and locations. Also let the variable R5500K(0,0) represent a reference mask of 5500K at location (0,0) for the red color plane. The correction point ratios to be stored for a correction of the illuminant at 2800K are:

for row = 0 to 2
for col = 0 to 2
R2800K/5500K(row, col) = R2800K(row, col)/R5500K(row, col)
GR2800K/5500K(row, col) = GR2800K(row, col)/GR5500K(row, col)

```
GB2800K/5500K(row, col) = GB2800K(row, col)/GB5500K(row, col)
B2800K/5500K(row, col) = B2800K(row, col)/B5500K(row, col)
end
end
```

Where R2800K(row,col) represents a reference mask of 2800K at location (0,0) for the red color plane. Variables GR2800K(row,col), GB2800K(row,col) and B2800K(row, co) represent the reference mask for the other color planes at the 2800K illuminant color temperature. GR2800K(row,col) is the green color in the green/red row of pixels, GB2800K (row,co) is the green color in the green/blue row of pixels, and B2800K(row,col) is the blue color. Using the algorithm above, 4 reference point ratios are calculated (1 for each of the four color planes) for each reference point location on the image sensor.

In other example embodiments of the invention, different mask patterns for the filter array covering the image sensor may create a different number of color planes, resulting in a different number of reference point ratios for each location used on the image sensor.

The same steps can be applied to generate the 7500K correction point ratios. Each of these ratios form a correction mask comprising a few locations for each color plane (In the example above: 9 locations). During correction of an image, the reference point ratios are fully populated using a two-dimensional interpolation algorithm (ex. bilinear, bicubic) for each color plane. Once the reference point ratios are fully populated, the reference point ratios are applied to the reference inversion mask by multiplication to form the actual inversion mask used.

For reference point ratios that are needed for color temperatures falling between the two extreme color temperatures (ex. 2800K and 7500K), interpolation can be used to find reference point ratios corresponding to other color temperature as needed. Because only a few reference point ratios are needed at each location for each reference mask at the extrema of color temperatures, the interpolation for finding reference masks at intermediate color temperature is expected to procedurally and computationally efficient.

In one example embodiment of the invention, the interpolation may use the different color temperatures of the illuminants as the interpolation values. For example, if the image was captured under an illuminant with a color temperature of 6500K and the reference mask was at a color temperature of 5500K and the reference point ratios were for a color temperature of 7500K, the interpolated reference point ratios for the 6500K color temperature would be 0.5 times, or halfway in-between, the reference point ratios for the 7500K color temperature.

The reference point ratios may not vary linearly across the color temperatures of the different illuminants. White balance gains, also called the channel balance multipliers, typically exist for each illuminant choice in the digital imaging device. White balance gains comprise a gain value for each color channel, at each illuminant choice. Reference point ratios have a more linear relationship to the white balance gains than to the color temperature of the illuminant choices. In one example embodiment of the invention, the white balance gains may be used as the interpolation values for creating the reference point ratios for color temperatures falling between the two extreme color temperatures. In one example embodiment of the invention, the white balance gains may be adjusted to a value in-between two of the illuminant choices before being used as the interpolation values for the reference point ratios.

The example embodiment of the invention described above uses a reference mask for a color temperature in the middle of the range of color temperatures (5500K in the range between 2800 k and 7500K). In another example embodiment of the invention, the reference mask may be created at one end of the range of color temperatures, for example 2800K, and only one set of reference point ratios would be created at the other end of the range of color temperatures, for example 7500K. Because the storage required to save each set of reference point ratios is small, for example 72 bytes, this only saves a small amount of space.

In another example embodiment of the invention, more than one reference inversion mask may be saved. For example, two reference inversion masks may be saved where the two reference inversion masks are for color temperatures at $\frac{1}{3}^{rd}$ and $\frac{2}{3}^{rd}$ of the total range of color temperatures. Three sets of reference point ratios would be saved, one at each extreme color temperatures, and one in the middle of the range of color temperatures.

FIG. 4 is a flow chart showing the process used to correct an image in an example embodiment of the invention. At step 402 an image is captured. At step 404 the illuminant for the captured scene is determined. At step 406 the determined illuminant is compared to the reference illuminant. If the determined illuminant is equal to the reference illuminant, the reference inversion mask is selected at step 408. At step 409 the captured image is corrected using the reference inversion mask.

When the determined illuminant is not equal to the reference illuminant at step 406, the determined illuminant is compared to the two illuminants at the two color temperature extremes at step 410. When the determined illuminant for the captured scene is equal to one of the two extreme color temperatures, the reference point ratios for the extreme color temperature that matches the determined illuminant are selected at step 414. At step 416 the reference inversion mask is modified using the selected reference point ratios. The captured image is then corrected using the modified inversion mask at step 418.

When the determined illuminant for the captured scene is not equal to one of the two extreme color temperatures, at step 412 reference point ratios for the determined illuminant are calculated. At step 416 the reference inversion mask is modified using the calculated reference point ratios. The captured image is then corrected using the modified inversion mask at step 418.

What is claimed is:
1. A method for correcting a captured image, comprising:
determining an illuminant for the captured image;
when the determined illuminant matches a reference illuminant;
    correct the image with a reference inversion mask;
when the determined illuminant matches a first extreme illuminant;
    modify the reference inversion mask using a first set of reference point ratios that corresponds to the first extreme illuminant; and
    correct the image with the modified inversion mask;
when the determined illuminant does not match the first extreme illuminant or the reference illuminant;
    calculate a set of reference point ratios for the determined illuminant;

modify the reference inversion mask using the calculated set of reference point ratios; and
correct the image with the modified inversion mask.

2. The method of claim 1, further comprising:
when the determined illuminant matches a second extreme illuminant;
modify the reference inversion mask using a second set of reference point ratios that corresponds to the second extreme illuminant; and
correct the image with the modified inversion mask.

3. The method of claim 1, further comprising:
fully populating the first set of reference point ratios that corresponded to the first extreme illuminant before modifying the reference inversion mask.

4. The method of claim 3, wherein the first set of reference point ratios are fully populated using a two-dimensional interpolation algorithm.

5. The method of claim 1, wherein the reference illuminant is for a color temperature at one end of a range of color temperatures.

6. The method of claim 1, wherein the reference illuminant is for a color temperature in a middle of a range of color temperatures.

7. The method of claim 6, wherein the reference illuminant is for a color temperature of 5500K.

8. The method of claim 1, wherein the calculated set of reference point ratios for the determined illuminant are calculated using interpolation.

9. The method of claim 8, wherein white balance gains are used as the interpolation values.

10. The method of claim 1, further comprising:
capturing an image using a, reference illuminant at a reference color temperature;
creating the reference inversion mask for the reference illuminant;
capturing an image using the first extreme illuminant at a first color temperature extreme;
determining the first set of reference point ratios for the first extreme illuminant;
saving the reference inversion mask and the first set of reference point ratios.

11. The method of claim 10, further comprising:
capturing an image using a second extreme illuminant at a second color temperature extreme;
determining a second set of reference point ratios for the second extreme illuminant;
saving the second set of reference point ratios.

12. The method of claim 10, wherein locations for the reference point ratios are spaced non-linearly across an image sensor.

13. A digital imaging device, comprising:
an image sensor configured to capture images;
a processor configured to determine an illuminant for the captured image;
a memory area configured to hold a first reference inversion mask and a first set of reference point ratios,
the processor configured to correct the captured image using the first reference inversion mask when the determined illuminant matches a first reference illuminant; and
the processor configured to modify the first reference inversion mask using a first one end of a range of color temperatures, and then correct the captured image using the modified first reference inversion mask when the determined illuminant does not match the first reference illuminant.

14. The digital imaging device of claim 13, wherein the first reference illuminant is for a color temperature at one end of a range of color temperatures.

15. The digital imaging device of claim 13, wherein the first reference illuminant is for a color temperature in a middle of a range of color temperatures.

16. The digital imaging device of claim 13, further comprising:
a second reference illuminant wherein the first reference illuminant is for a color temperature $\frac{1}{3}^{rd}$ along a range of color temperatures and the second reference illuminant is $\frac{2}{3}^{rd}$ along the range of color temperatures; and
wherein the processor is configured to correct the captured image using a second reference inversion mask when the determined illuminant matches the second reference illuminant.

17. A digital imaging device, comprising:
an image sensor configured to capture images;
a processor configured to determine an illuminant for the captured image;
a memory area configured to hold a first reference inversion mask and a first set of reference point ratios;
the processor configured to correct the captured image using the first reference inversion mask when the determined illuminant matches a first reference illuminant; and
the processor configured to modify the first reference inversion mask using a calculated set of reference point ratios when the determined illuminant does not match either a first extreme illuminant or the reference illuminant, and then correct the captured image using the modified first reference inversion mask when the determined illuminant does not match the first reference illuminant.

18. The digital imaging device of claim 17, wherein the first reference illuminant is for a color temperature at one end of a range of color temperatures.

19. The digital imaging device of claim 17, wherein the first reference illuminant is for a color temperature in a middle of a range of color temperatures.

* * * * *

UNITED STATES PATENT AND TRADEMARK OFFICE
CERTIFICATE OF CORRECTION

PATENT NO. : 7,755,671 B2
APPLICATION NO. : 11/738635
DATED : July 13, 2010
INVENTOR(S) : Yu-wei Wang et al.

It is certified that error appears in the above-identified patent and that said Letters Patent is hereby corrected as shown below:

In column 7, line 32, in Claim 10, delete "a," and insert -- a --, therefor.

In column 8, line 2, in Claim 13, delete "ratios," and insert -- ratios; --, therefor.

In column 8, line 8, in Claim 13, delete "first one end" and insert -- first set of reference point ratios when the determined illuminant is at a color temperature at one end --, therefor.

Signed and Sealed this

Sixteenth Day of November, 2010

David J. Kappos
*Director of the United States Patent and Trademark Office*